United States Patent
Feast et al.

(10) Patent No.: US 10,056,094 B2
(45) Date of Patent: Aug. 21, 2018

(54) METHOD AND APPARATUS FOR SPEECH BEHAVIOR VISUALIZATION AND GAMIFICATION

(71) Applicant: Cogito Corporation, Boston, MA (US)

(72) Inventors: Joshua Feast, Boston, MA (US); Ali Azarbayejani, Boston, MA (US); Skyler Place, Boston, MA (US)

(73) Assignee: Cogito Corporation, Boston, MA (US)

( * ) Notice: Subject to any disclaimer, the term of this patent is extended or adjusted under 35 U.S.C. 154(b) by 0 days.

(21) Appl. No.: 14/440,409

(22) PCT Filed: Mar. 12, 2015

(86) PCT No.: PCT/US2015/020303
§ 371 (c)(1),
(2) Date: May 4, 2015

(87) PCT Pub. No.: WO2015/138814
PCT Pub. Date: Sep. 17, 2015

(65) Prior Publication Data
US 2015/0348570 A1    Dec. 3, 2015

Related U.S. Application Data

(63) Continuation-in-part of application No. 14/205,602, filed on Mar. 12, 2014, now Pat. No. 9,947,342.

(51) Int. Cl.
*G10L 21/00* (2013.01)
*G10L 25/48* (2013.01)
(Continued)

(52) U.S. Cl.
CPC .......... *G10L 25/48* (2013.01); *G06Q 10/0639* (2013.01); *H04M 3/5175* (2013.01);
(Continued)

(58) Field of Classification Search
CPC ......... G10L 25/48; G10L 25/03; G10L 25/06; G10L 25/09; G10L 25/10; G10L 25/12;
(Continued)

(56) References Cited

U.S. PATENT DOCUMENTS

| 6,480,600 B1 | 11/2002 | Neyman et al. |
| 6,754,331 B2 | 6/2004 | McCormack |

(Continued)

FOREIGN PATENT DOCUMENTS

| EP | 2 297 933 A1 | 3/2011 |
| EP | 2 600 292 A1 | 6/2013 |
| WO | WO-2009/153581 A1 | 12/2009 |

OTHER PUBLICATIONS

De Jong, N. H. and Wempe, T., Praat script to detect syllable nuclei and measure speech rate automatically, Behavior Research Methods, 41(2):385-390 (2009).

(Continued)

*Primary Examiner* — Chan S Park
*Assistant Examiner* — Stephen M Brinich
(74) *Attorney, Agent, or Firm* — Choate, Hall & Stewart LLP; William R. Haulbrook; Alexander D. Augst

(57) ABSTRACT

In some example embodiments, a system is provided for real-time analysis of audio signals. First digital audio signals are retrieved from memory. First computed streamed signal information corresponding to each of the first digital audio signals is generated by computing first metrics data for the first digital audio signals, the first computed streamed signal information including the first metrics data. The computed first streamed signal information is stored in the memory. The first computed streamed signal information is transmitted to one or more computing devices. Transmitting the first computed streamed signal information to the one or more computing devices causes the first computed streamed signal (Continued)

information to be displayed at the one or more computing devices.

11 Claims, 9 Drawing Sheets

(51) Int. Cl.
*H04M 3/51* (2006.01)
*G06Q 10/06* (2012.01)
*H04M 7/00* (2006.01)

(52) U.S. Cl.
CPC .......... *H04M 3/5183* (2013.01); *H04M 7/009* (2013.01); *H04M 2203/252* (2013.01); *H04M 2203/357* (2013.01)

(58) Field of Classification Search
CPC ......... G10L 25/15; G10L 25/18; G10L 25/21; G10L 25/24; G10L 25/27; G10L 25/45; G10L 25/60; G10L 25/63; G10L 25/66; G10L 25/72; G10L 25/75
USPC ....... 704/270, 251, 275, 243, 233, 207, 244, 704/250, 255
See application file for complete search history.

(56) References Cited

U.S. PATENT DOCUMENTS

| | | | |
|---|---|---|---|
| 7,606,718 B2 | 10/2009 | Cloran | |
| 8,068,599 B2 | 11/2011 | Sarin et al. | |
| 8,078,470 B2 | 12/2011 | Levanon et al. | |
| 8,204,747 B2 | 6/2012 | Kato et al. | |
| 8,537,983 B1 | 9/2013 | Haggerty et al. | |
| 2004/0249639 A1* | 12/2004 | Kammerer | G10L 15/063 704/249 |
| 2006/0233346 A1 | 10/2006 | McIlwaine et al. | |
| 2007/0195945 A1 | 8/2007 | Korenblit et al. | |
| 2008/0103781 A1* | 5/2008 | Wasson | G10L 17/26 704/277 |
| 2011/0033036 A1 | 2/2011 | Edwards et al. | |
| 2011/0178803 A1 | 7/2011 | Petrushin | |
| 2011/0282663 A1* | 11/2011 | Talwar | G10L 15/20 704/233 |
| 2011/0307258 A1 | 12/2011 | Liberman et al. | |
| 2013/0028399 A1 | 1/2013 | Kopparapu et al. | |
| 2013/0177148 A1 | 7/2013 | Lee | |
| 2013/0195302 A1* | 8/2013 | Meincke | G10L 21/02 381/321 |
| 2013/0208881 A1 | 8/2013 | Pande et al. | |
| 2014/0140497 A1 | 5/2014 | Ripa et al. | |
| 2015/0264177 A1 | 9/2015 | Feast et al. | |
| 2015/0364130 A1* | 12/2015 | Ponting | G10L 17/00 704/246 |

OTHER PUBLICATIONS

Hillenbrand, J. and Houde, R. A., Acoustic Correlates of Breathy Vocal Quality: Dysphonic Voices and Continuous Speech, Journal of Speech and Hearing Research, 39:311-321 (1996).

International Search Report, PCT/US15/20303, 4 pages, dated Jul. 31, 2015.

Liu, H.M. et al., The effect of reduced vowel working space on speech intelligibility in Mandarin-speaking young adults with cerebral palsy, J. Acoust. Soc. Am. 117(6):3879-3889 (2005).

Lugger, M. et al., Robust Estimation of Voice Quality Parameters Under Real World Disturbances, IEEE, Proceedings of ICASSP, I-1097-I-1100 (2006).

Morgan, N. and Fosler-Lussier, E., Combining Multiple Estimators of Speaking Rate, International Conference on Acoustic, Speech, and Signal Processing (ICASSP-98) 729-732 (1998).

Morgan, N. et al., Speech Recognition Using On-Line Estimation of Speaking Rate, ESCA, Eurospeech97, Rhodes, Greece, ISSN 1018-4074:2079-2082 (1997).

Picart, B. et al., Analysis and Synthesis of Hypo and Hyperarticulated Speech, Proceedings of the Speech Synthesis Workshop (SSW), 8 pages, (2010).

Scherer, S. et al., Reduced Vowel Space is a Robust Indicator of Sychological Distress: A Cross-Corpus Analysis, ICASSP 4789-4793 (2015).

Stevens, K. N. and Hanson, H. M., Classification of Glottal Vibration from Acoustic Measurements, Vocal Fold Physiology, 147-170 (1994).

Written Opinion, PCT/US15/20303, 11 pages, dated Jul. 31, 2015.

\* cited by examiner

METHOD AND APPARATUS FOR SPEECH BEHAVIOR VISUALIZATION AND GAMIFICATION

CROSS-REFERENCE TO RELATED APPLICATION

The present application claims priority to U.S. patent application Ser. No. 14/205,602, filed on Mar. 12, 2014 and titled "METHOD AND APPARATUS FOR SPEECH BEHAVIOR VISUALIZATION AND GAMIFICATION," the entire contents of which are hereby incorporated by reference herein.

FIELD OF THE INVENTION

The present invention generally relates to speech behavior visualization and gamification, and more particularly to systems, methods and apparatuses for proving real-time analysis of audio signals.

BACKGROUND

Research and development focused on customer connections to and from the call center has been around for some time, and supervisors and managers will review call length and call frequency data from time-to-time to understand performance. Thanks to speech-to-text technologies, they may also search recordings of conversations for key words. However, so far the art has not found effective ways to support active feedback, supervision and review of conversations based on behavior, especially in real time and across distributed teams. In this context, the term behavior refers to how people speak, and specifically the tonal, pacing, mirroring and turn-taking measurements that describe how people come across to each other independently of the words that they use.

Providing an excellent customer experience in call centers has increasingly become strategic for enterprise, and there is an increasing understanding that how an agent comes across can affect conversation outcomes. The status quo in call center agent feedback and supervision is for supervisors to randomly select an agent-member conversation to listen to and provide commentary. Agents have few tools that readily support self-study and self-improvement. Supervisors have no way to track multiple agents, and few methods for intelligently selecting which conversation to listen in on. Many supervisors only review a single conversation a month for each of the agents in their team and thus have little information about how their agents are sounding while they are speaking with customers. This situation becomes even more challenging because call center teams are increasing dispersed, with many agents now working from home thus reducing a supervisor's ability to listen for tone and behavior by walking around an office space. At the same time, call center teams can also suffer from significant turnover, resulting in a high need for training.

Disclosed is a system for extracting and visualizing behavioral insight from speech interactions in real-time. The system provides a scalable solution for the real-time capture, transformation, and visualization of the non-verbal components of speech and voice interactions. Vocal signals, such as speaking rate, conversational flow, dynamism, vocal effort and events such as laughter and audible breathing are extracted from audio streams such as phone calls, transformed into quantitative values that change over time, and visualized in a dashboard display. The system also allows for the visualization of multiple live conversations simultaneously, allowing for the observation and monitoring of multiple individuals. For example, call center supervisors can monitor the conversations of many agents in real-time, and use the visualized information to drive their training, monitoring, and feedback processes. Agents can review their prior conversations, and evaluate both their own signal data as well as that of anyone they were speaking with, allowing for longitudinal analysis of customer reactions, interest and engagement. Furthermore, the system provides a gamification element, by visualizing in real-time individual and team progress against benchmarks, prior performance, team averages or other company dictated milestones. This drives agent and supervisor performance and engagement with their existing workflow, helping a company further achieve stated milestones. Overall, the system is designed to visualize vocal signal information to agents and supervisors, allowing them to utilize these changing metrics to inform their own decision making process. In this sense, the system provides situational awareness for speech interactions.

Features and Advantages

In a call center, the system enhances supervisors ability to monitor agent performance. With distributed and remote offices, including capabilities for many agents to work from home, direct supervision of agents is often difficult. The system enables real-time remote monitoring of calls and call outcomes, allowing supervisors to better monitor and help guide agents within and between calls, who are either local and remote to the supervisor. The system further includes behavioral signal analysis that is universal and independent of language. This enhances support of dispersed teams from different countries and cultural backgrounds, making it easier to be successful with call center "off-shoring."

The system provides analysis for training agents and enhancing their skills. The system provides continuous agent feedback on vocal attributes, which may be used when training new employees/agents. The feedback provided during calls helps reinforce the lessons presented in training seminars.

The system may monitor, track, and/or analyze member or customer changes over time. The systems provides real-time and post-call quantification of member distress and engagement for each phone interaction. This data is recorded and may be used by agents, supervisors, and/or analysts to understand patterns of member behavior, and utilized to change agent interactions or company policy.

The system may quantify agent performance and member interest relative to business or program outcomes. Quantified data gathered in real-time, at the call or individual level, may be compared to business outcomes and objectives, allowing an analysis of how individual agent performance on calls affects these outcomes. Furthermore, the data may be extracted and included as important input variables to predictive models that forecast business outcomes in advance.

The system may produce context independent values. The system transforms and visualizes behavioral data streams, allowing the agent and/or supervisor to utilize this information to drive their own decision making process. In this fashion the system is context independent, the information available is near universally valuable, when combined with specific training objectives, performance goals, or program outcome achievements. This allows customers to compare signal values across varying agents, programs, or business units.

The system enhances agent skills and decision-making directly through visualization and comparison, injecting a gamification element that makes their work more enjoyable.

The system also improves the customer's call center experience, increasing the probability that they have a successful interaction.

The system analyzes not what a person says, but how they say it. The system combines analytics with human intelligence to drive decision-making, taking advantage of the strengths of both components (technology & human intellect). Most vocal analytic platforms perform automated speech recognition paired with keyword and word prevalence machine learning techniques. This system uses the information in how people are speaking, not what they are saying. Furthermore, this datastream is inherently context independent, and does not have to be trained for a particular environment to provide value. The system provides value through these transformed vocal acoustic data streams.

The system provides real-time processing of vocal acoustic information in a phone call, including both parties. Vocal acoustic information on the call is processed in real time, for both parties on the call. Low-level signal information is processed using time-series oriented machine learning techniques to extract perceptual level features such as, but not limited to, speaking rate, conversational flow, dynamism, activity, vocal effort, and events such as laughter and audible breathing. These transformed values are stored in a database, allowing for the real-time, post-call, and batch analysis of signal data.

The real-time transformed vocal-acoustic data is visualized in single call and multi call dashboards. This allows users to see changes in the underlying agent and customer behavior, intentions, engagement and distress levels in real-time as a call progresses. Both in-call and post-call data can be visualized and presented.

This actionable data visualization allows for the user to make better-informed decisions. The visualized data is an input to the human decision making process. As the visualizations themselves are not driven by decision trees or alert-based algorithms, they can more easily be context independent. Therefore, based on the goals and context of the user, the same information can provide the impetus for different user decisions and actions.

The data gathering, transformation, and visualization components allow for simultaneous computation and presentation of multiple data streams from multiple conversations. A supervisor may monitor many agents in real-time, in a simultaneous instead of serial fashion. This can include work-at-home agents, as the system can monitor datastreams and phone calls from multiple sources, both internal and external to the organization.

Visualizations for both agents and supervisors may include gamification elements, which allow the comparison of the current performance against individual goals, individual past performance, current team-average, current team-best, company benchmarks, or other program related outcomes. Currently in call centers there is no way for agents to have immediate feedback on performance or to compare their performance to their fellow agents. This system creates a competitive game-feel to the normal enterprise work-flow, by introducing self, team, and company comparisons. This drives not only performance, but agent interest and intention, and can build a sense of both individual and team pride in assignments.

The system can be applied to any audio input, expanding application beyond multi-party conversations to single person monologues, multi-party conversations, and even non-human speech such as evaluation of computer voice programs.

SUMMARY

The example embodiments presented herein are directed to systems, methods and apparatuses for speech behavior visualization and gamification.

In some example embodiments, a method is provided for real-time graphical presentation of speech audio signal analytics of a multi-party telephonic communication for feedback to a party. A processor of a computing device is used to compute, on a continuous (or semi-continuous) basis during the multi-party telephonic communication between a first party (e.g., an agent) and a second party, a set of metrics from a digital audio signal corresponding to the multi-party telephonic communication. The set of metrics includes at least one of (i) to (ix), as follows (e.g., computed on an ongoing basis throughout the telephonic communication for substantially contemporaneous graphical real-time feedback to the agent): (i) a measure of pace (e.g., "speaking rate") at which the first party has spoken and a measure of pace at which the second party has spoken (e.g., graphically charted together for comparison), over an interval of time (e.g., a running measure over a previous interval of time, e.g., the previous minute, the previous 2 minutes, the previous 3 minutes, or since the beginning of the communication, etc., and/or a running "instantaneous" measure over a shorter preceding period of time, e.g., wherein the shorter preceding period of time is no greater than 10 seconds, 5 seconds, 3 seconds, 1 second, 0.5 second, 0.3 second, 0.2 second, or 0.1 second); (ii) a measure of tone (e.g., "dynamic variation") with which the first party has spoken and a measure of tone with which the second party has spoken (e.g., graphically charted together for comparison), over an interval of time (e.g., a running measure over a previous interval of time, e.g., the previous minute, the previous 2 minutes, the previous 3 minutes, or since the beginning of the communication, etc., and/or a running "instantaneous" measure over a shorter preceding period of time, e.g., wherein the shorter preceding period of time is no greater than 10 seconds, 5 seconds, 3 seconds, 1 second, 0.5 second, 0.3 second, 0.2 second, or 0.1 second); (iii) a measure of speaking rate (e.g., articulation rate, or syllable rate, e.g., "pace") at which the first party has spoken and a measure of speaking rate at which the second party has spoken (e.g., graphically charted together for comparison), over an interval of time (e.g., a running measure over a previous interval of time, e.g., the previous minute, the previous 2 minutes, the previous 3 minutes, or since the beginning of the communication, etc., and/or a running "instantaneous" measure over a shorter preceding period of time, e.g., wherein the shorter preceding period of time is no greater than 10 seconds, 5 seconds, 3 seconds, 1 second, 0.5 second, 0.3 second, 0.2 second, or 0.1 second); (iv) a measure of vocal effort with which the first party has spoken and a measure of vocal effort with which the second party has spoken (e.g., graphically charted together for comparison), over an interval of time (e.g., a running measure over a previous interval of time, e.g., the previous minute, the previous 2 minutes, the previous 3 minutes, or since the beginning of the communication, etc., and/or a running "instantaneous" measure over a shorter preceding period of time, e.g., wherein the shorter preceding period of time is no greater than 10 seconds, 5 seconds, 3 seconds, 1 second, 0.5 second, 0.3 second, 0.2 second, or 0.1 second); (v) a measure of degree of articulation (e.g., "articulation space") with which the first party has spoken and a measure of degree of articulation with which the second party has spoken (e.g., graphically charted together for comparison), over an interval of time (e.g., a running measure over a previous interval of time, e.g., the previous minute, the previous 2 minutes, the previous 3 minutes, or since the beginning of the communication, etc., and/or a running "instantaneous" measure over a shorter preceding period of time, e.g., wherein the shorter preceding period of time is no greater than 10 seconds, 5 seconds, 3 seconds, 1 second, 0.5 second, 0.3 second, 0.2 second, or 0.1 second); (vi) a measure of amount of time the first party has spoken relative to the second party (e.g., "speaking participation") over an interval of time (e.g., a running measure over the previous minute, or the previous 2 minutes, or the previous 5 minutes, or the previous 10 minutes, or the previous 15 minutes, and/or since the beginning of the communication, etc.); (vii) a measure of conversational engagement of the parties over an interval of time (e.g., a running measure over the previous minute, or the previous 2 minutes, and/or since the beginning of the communication, etc.); (viii) a measure of perceived depression with which a party (e.g., the second party) has spoken over an interval of time (e.g., a running measure over the previous minute, or the previous 2 minutes, or the previous 5 minutes, or the previous 10 minutes, or the previous 15 minutes, and/or since the beginning of the communication, etc.); and (ix) a measure of conversational flow over an interval of time (e.g., a running measure over the previous minute, or the previous 2 minutes, or the previous 5 minutes, or the previous 10 minutes, or the previous 15 minutes, and/or since the beginning of the communication, etc.). A processor of a computing device (e.g., may or may not be the same processor or computing device as used in the computing step above) is used to render, on a continuous (or semi-continuous) basis during the multi-party telephonic communication, one or more graphical user interface widgets for substantially contemporaneous presentation on a display to the first party (e.g., the agent), wherein the one or more widgets are graphically representative of (or derived from) the one or more metrics and are rendered for display on a real-time (or near real-time) basis (e.g., for purposes of providing real-time feedback to the first party about the quality and/or effectiveness of the telephonic communication, e.g., thereby allowing for adjustment by the first party of her/his participation in the communication in a manner to improve the quality and/or effectiveness of the telephonic communication).

In some example embodiments, rendering includes rendering a timeline widget that scrolls contemporaneously with at least a portion of the telephonic communication graphically indicating when the first party is speaking and when the second party is speaking (e.g., by presenting growing bars of corresponding color, leaving behind a graphical record that can be immediately visually perceived by the first party as indicating when and for how long each party spoke during the telephonic communication).

In some example embodiments, rendering includes rendering a numerical representation of the measure of conversational engagement (e.g., "engagement score") at intervals (e.g., regular intervals) contemporaneously with at least a portion of the telephonic communication (e.g., graphically overlayed or presented in relation to the timeline widget), leaving behind a graphical record of engagement scores corresponding to intervals of time during the telephonic communication.

In some example embodiments, each rendering of engagement score is color-coded such that low engagement scores can be immediately visually differentiated from high engagement scores.

In some example embodiments, rendering includes rendering a "tone" widget comprising a graphical element (e.g., line or dot on a graph) representing the measure of tone of the first party (e.g., agent) in positional relation to (e.g., next to) a graphical element representing the measure of tone of the second party, and updating the widget substantially contemporaneously with the telephonic communication to reflect changes in the measures of tone of the first party and second party (e.g., thereby facilitating mirroring (e.g. matching) of the tone of the second party by the first party).

In some example embodiments, the tone widget graphically reflects both an "instantaneous" (e.g., determined over a shorter period of time, e.g., the previous 10 seconds, 5 seconds, 2 seconds, 1 second, etc.) measure of tone of the first and second parties, and a rolling measure (e.g., determined over a longer period of time, e.g., 30 seconds, 1 minutes, 2 minutes, 3 minutes, 5 minutes, etc.) of tone of the first and second parties.

In some example embodiments, the render includes rendering a "pace" widget comprising a graphical element (e.g., line or dot on a graph) representing the measure of speaking rate (e.g., "pace") of the first party (e.g., agent) in positional relation to (e.g., next to) a graphical element representing the measure of speaking rate of the second party, and updating the widget substantially contemporaneously with the telephonic communication to reflect changes in the measures of speaking rate of the first party and second party (e.g., thereby facilitating mirroring (e.g., matching) of the speaking rate of the second party by the first party).

In some example embodiments, the pace widget graphically reflects both an "instantaneous" (e.g., determined over a shorter period of time, e.g., the previous 10 seconds, 5 seconds, 2 seconds, 1 second, etc.) measure of speaking rate of the first and second parties, and a rolling measure (e.g., determined over a longer period of time, e.g., 30 seconds, 1 minutes, 2 minutes, 3 minutes, 5 minutes, etc.) of speaking rate of the first and second parties.

In some example embodiments, the rendering includes rendering a "participation" widget comprising a graphical element (bar) representing the measure of amount of time the first party has spoken relative to the second party (e.g., "speaking participation") over an interval of time (e.g., a running measure over the previous minute, or the previous 2 minutes, or the previous 5 minutes, or the previous 10 minutes, or the previous 15 minutes, and/or since the beginning of the communication, etc.) (e.g., thereby providing a visual cue to the first party, e.g., agent, indicating that the first party is speaking too much, is speaking too little, or is speaking an acceptable amount of time in relation to the second party, thus facilitating adjustment by the first party of the time she/he is speaking during the telephonic communication).

In some example embodiments, the participation widget comprises a color-coded graphic visually indicating whether the measure of amount of time the first party has spoken relative to the second party over the interval of time is acceptable or not.

In some example embodiments, the set of metrics comprises at least two of (i) to (ix) (e.g., at least three, at least four, at least five, at least six, at least seven, at least eight, or all nine of (i) to (ix)).

In some example embodiments, a system is provided for real-time analysis of audio signals. First digital audio signals are retrieved from memory. First computed streamed signal information corresponding to each of the first digital audio signals is generated by computing first metrics data for the first digital audio signals, the first computed streamed signal information including the first metrics data. The computed first streamed signal information is stored in the memory. The first computed streamed signal information is transmitted to one or more computing devices. Transmitting the first computed streamed signal information to the one or more computing devices causes the first computed streamed signal information to be displayed at the one or more computing devices.

In some example embodiments, the first digital audio signals correspond to first source audio signals.

In some example embodiments, the real-time analysis is performed within a predetermined time between a first time of receiving the plurality of first source audio signals and a second time of transmitting the first computed streamed signal information to the agent computing device.

In some example embodiments, the plurality of first source audio signals are received via one or more of a voice over internet protocol (VoIP) and a public switched telephone network (PSTN).

In some example embodiments, the memory is operable to store historical metrics data. The first computed streamed signal information includes first contextual metrics data, the contextual metrics data indicating a comparison between the first metrics data and the historical metrics data.

In some example embodiments, the metrics are configured dynamically during a call associated with the first source audio signals.

In some example embodiments, the metrics are configured statically prior to a call associated with the first source audio signals.

In some example embodiments, second digital audio signals are retrieved from memory. Second computed streamed signal information corresponding to each of the second digital audio signals is generated by computing second metrics data for the second digital audio signals. The second computed streamed signal information includes the second metrics data. The computed second streamed signal information is stored in the memory. The second computed streamed signal information is transmitted to the one or more computing devices. Transmitting the second computed streamed signal information to the one or more computing devices causes the second computed streamed signal information to be displayed at the one or more computing devices.

In some example embodiments, the one or more computing devices includes a supervisor computing device. The first computed streamed signal information and the second computed streamed signal information is transmitted to and caused to be displayed at the supervisor computing device.

In some example embodiments, metrics included in the metrics data includes one or more of conversational participation, conversational flow, dynamic variation, speaking rate, vocal effort, hyper articulation and hypo articulation.

In some example embodiments, a system is provided for presenting analysis of speech audio signals in real-time. A real-time audio capture module is configured to receive source conversational audio signals of current audio involving an agent and convert the received audio signals into analyzable digital audio as streamed audio conversational signals. A real-time signal processing module is configured to apply metrics to transform the streamed audio conversational signals into computed streamed signals. An application server is configured to provide the computed streamed signals to the agent's computing device. An agent dashboard operated on the agent's computing device is configured to display the computed streamed signals and objectives for the agent.

In some example embodiments, an operational datastore is configured to store the streamed audio conversational signals and the computed streamed signals.

In some example embodiments, a supervisor's computing device configured to operate a multi-agent dashboard displaying, at the same time, the computed streamed signals involving the agent and computed streamed signals involving one or more other agents.

In some example embodiments, the source conversational audio signals are provided to the real-time audio capture system from a private branch exchange.

In some example embodiments, the source conversational audio signals are provided to the real-time audio capture system from a voice over internet protocol switch.

In some example embodiments, the applied metrics are statically configured in advance of receiving the source conversational audio signals.

In some example embodiments, the applied metrics are dynamically configured during a conversation.

In some example embodiments, the applied metrics are configured to analyze one or more non-verbal audio aspects of speech.

In some example embodiments the objectives include historical metrics.

In some example embodiments, the historical metrics are for prior conversations involving the agent.

In some example embodiments, the historical metrics are for prior conversations involving a team of multiple agents.

In some example embodiments, the objectives include a target value configured at an individual agent, team, or organizational level.

In some example embodiments, the target value is based on learned analysis of connections between computed streamed signals and past business outcomes.

In some example embodiments, a method is provided for presenting analysis of speech audio signals in real-time. Source conversational audio signals of current audio involving an agent by a real-time audio capture system are received. The real-time audio capture system converts the received audio signals into analyzable digital audio as streamed audio conversational signals. Metrics are applied by a real-time signal processing system to the streamed audio conversational signals to transform the streamed audio conversational signals into computed streamed signals. The computed streamed signals are provided from an application server to the agent's computing device. An agent dashboard on the agent's computing device is operated. The computed streamed signals and objectives for the agent are displayed on the agent dashboard.

In some example embodiments, the streamed audio conversational signals and the computed streamed signals are stored in an operational datastore.

In some example embodiments, a multi-agent dashboard is operated on a supervisor's computing device. The computed streamed signals involving the agent and computed streamed signals involving one or more other agents are displayed on the multi-agent dashboard at the same time.

In some example embodiments, the source conversational audio signals are provided to the real-time audio capture system from a private branch exchange.

In some example embodiments, the source conversational audio signals are provided to the real-time audio capture system from a voice over internet protocol switch.

In some example embodiments, the applied metrics are statically configured in advance of receiving the source conversational audio signals.

In some example embodiments, the applied metrics are dynamically configured during a conversation.

In some example embodiments, one or more non-verbal audio aspects of speech are analyzed through the applied metrics.

In some example embodiments, historical metrics are included in the objectives.

In some example embodiments, metrics from prior conversations involving the agent are included in the historical metrics.

In some example embodiments, metrics from a team of multiple agents are included in the historical metrics.

In some example embodiments, a target value is configured in the objectives at an individual agent, team, or organizational level.

In some example embodiments, the target value is based on learned analysis of connections between computed streamed signals and past business outcomes.

BRIEF DESCRIPTION OF THE DRAWINGS

The foregoing and other objects, aspects, features, and advantages of the present disclosure will become more apparent and better understood by referring to the following description taken in conjunction with the following drawings.

Figure 1:
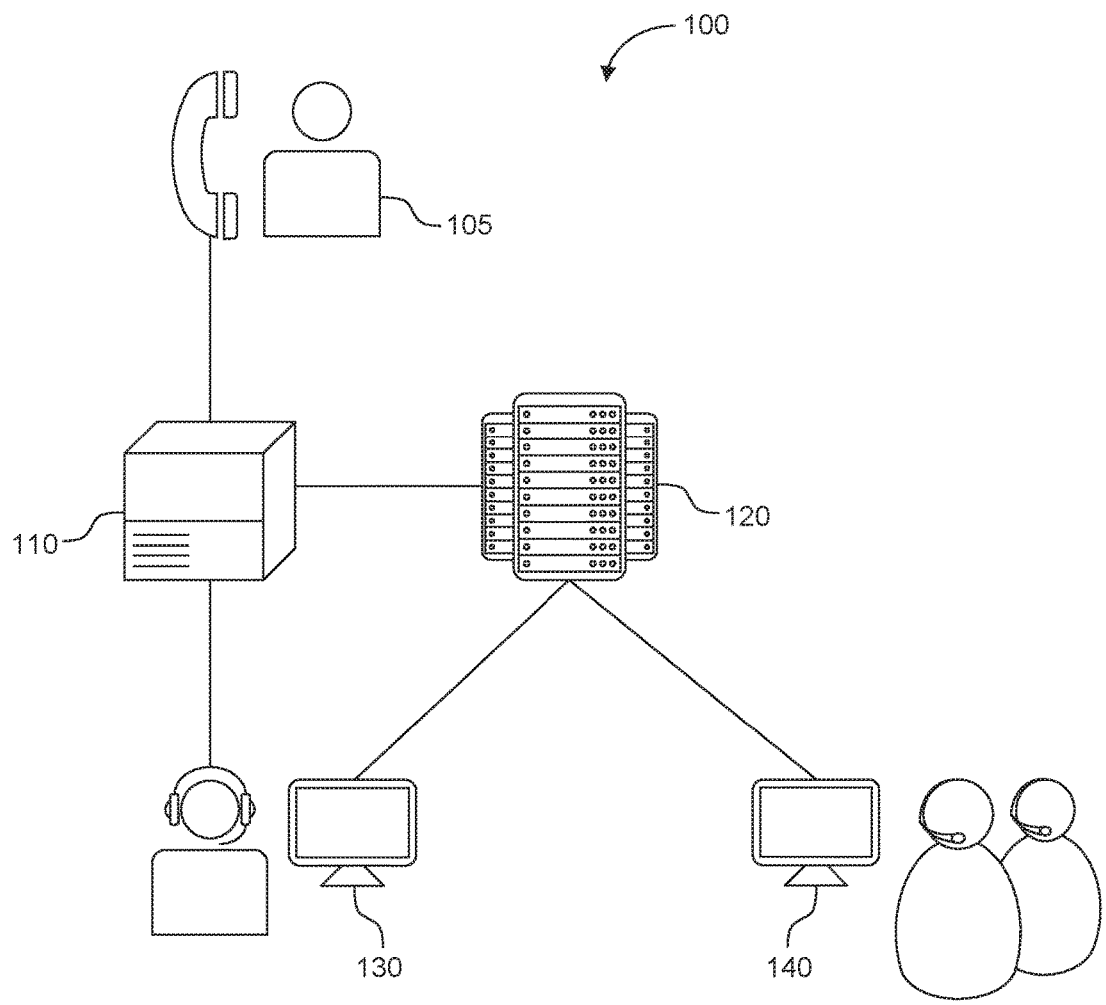
FIG. 1 is a diagram illustrating a system for providing real-time analysis of audio signals according to an exemplary embodiment.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Conversation: A speech interaction involving one or more human or non-human actors Real-time: In the context of consuming, producing, and transforming time-series signals, real-time means that consumption, production, and transformation of signal elements all can be accomplished at a faster rate than the signal element rate and at low-latency (relative to human perception).

Audio Signal: An electrically represented time-series amplitude signal representing audible sound.

Source Conversational Audio Signal: An Audio Signal representing human speech in the raw form received by the system. Typically this audio signal is channel-separated sound of one or multiple people conversing with one another (each speaker's voice can be isolated from the others) or VoIP (Voice over Internet Protocol) signals, isolated digital signals captured from microphones, etc.

PSTN: "Public Switched Telephone Network". The public telephone network that allows any telecommunications device in the world to communicate with any other.

PBX: "Private Branch Exchange". An organization's private telecommunication network that interfaces with the PSTN and results in multiple Conversational Audio Signals to and from telecommunications devices, including telephones, in the organization. Typically this involves Avaya- or Cisco-branded PBX products.

Streamed Conversational Audio Signal: An Audio Signal representing human speech in the streamed form used internally in the system. One example of such audio signal is in a multiple-channel streamed WAV audio format.

Streamed Signal: Any sequence of Interval-Value Elements with increasing End Time.

Interval-Value Element: An element of a Streamed Signal which contains a time interval, consisting of Begin Time and End Time, and a corresponding value, which can be of any numeric type.

Real-time Audio Capture System: A component that captures Source Conversational Audio signals and transforms them into Streamed Conversational Audio Signals.

Real-time Signal Processing System: A component that consumes Streamed Conversational Audio Signals and produces Computed Streamed Signals, which can represent moving or running metrics characterizing the human conversation represented by the audio signal.

Computed Streamed Signal: Any Streamed Signal produced by the Real-time Signal Processing System as a transformation based on audio signal input.

Operational Datastore: A component that stores and retrieves all Application Data, including Streamed Conversational Audio Signals and Computed Streamed Signals, in Real-time.

Application Data: All data that is represented to a user through the GUI components (Single Agent Dashboard, Multi Agent Dashboard).

Application Server: A component that mediates the consumption and production of Application Data between user interfaces (Single Agent Dashboard, Multi Agent Dashboard) and the Operational Datastore.

Organization: A company or other agency or entity which would typically be the beneficiary of the system. Specifically, the system benefits organizations which maintain have live conversations with important Associates, who could be customers, members, prospective customers, or clients of the Organization.

Agent: A person or input-provider with access to application data stemming from source conversational audio signals of that person or input-provider. In relation to Organizations utilizing the system, an agent is a representative of the Organization who participates in conversations with Associates of the Organization.

Supervisor: A person who is responsible for supervising one or more Agents.

Associate: A non-agent participating in a conversation providing source conversational audio signals. In relation to Organizations utilizing the system, an associate is a person associated with the Organization, as a customer, a member, a prospective customer, a client, or in any other relationship in which speech interactions with the Organization may be a beneficial aspect of the relationship to either party.

Single Agent Dashboard: Real-time Graphical User Interface with which an Agent or Supervisor interacts. The Single Agent Dashboard conveys real-time information analyzed from a source conversational audio signal, allowing the Agent or Supervisor to visualize various aspects of the audio or conversation as it unfolds and providing various information to support decision-making during a conversation.

Multi Agent Dashboard: Real-time Graphical User Interface with which a Supervisor or Agent interacts. The Multi Agent Dashboard conveys real-time information about a number of simultaneous current Agent or Supervisor conversations, allowing visualization of various aspects of multiple conversations as they unfold, providing awareness of various characteristics of the conversation, and supporting decision-making.

The example embodiments presented herein are directed to systems, methods and apparatuses for speech behavior visualization and gamification. More specifically, the example embodiments described herein provide systems, methods, and apparatuses for providing real-time analysis of audio signals.

FIG. 1 is a diagram illustrating a system 100 for providing real-time analysis of audio signals, according to an exemplary embodiment. The system 100 includes an associate and associate device 105. The associate device may be a computing device (e.g., laptop, computer, tablet), mobile device, telephone, voice over internet protocol (VoIP) phone, or the like, associated with an associate. It should be understood that although a single associate and associate device pair 105 is illustrated in FIG. 1, the system 100 may include any number of associate and associate device pairs.

The system 100 also includes a private branch exchange (PBX) system 110 for managing (e.g., receiving, switching) calls between users (e.g., agents) and devices (e.g. phones). For example, the PBX system 110 may receive audio signals from a call from associate device 105, and transmit the audio signals to other users and/or devices, such as audio analysis system 120, agent (and agent device) 130 and supervisor (and supervisor device) 140. It should be understood that only a single PBX system (e.g., PBX system 120), agent (e.g., agent 130) and supervisor (e.g., supervisor 140) are illustrated in FIG. 1, the system 100 may include any number of PBS systems, agents and supervisors.

Figure 2:
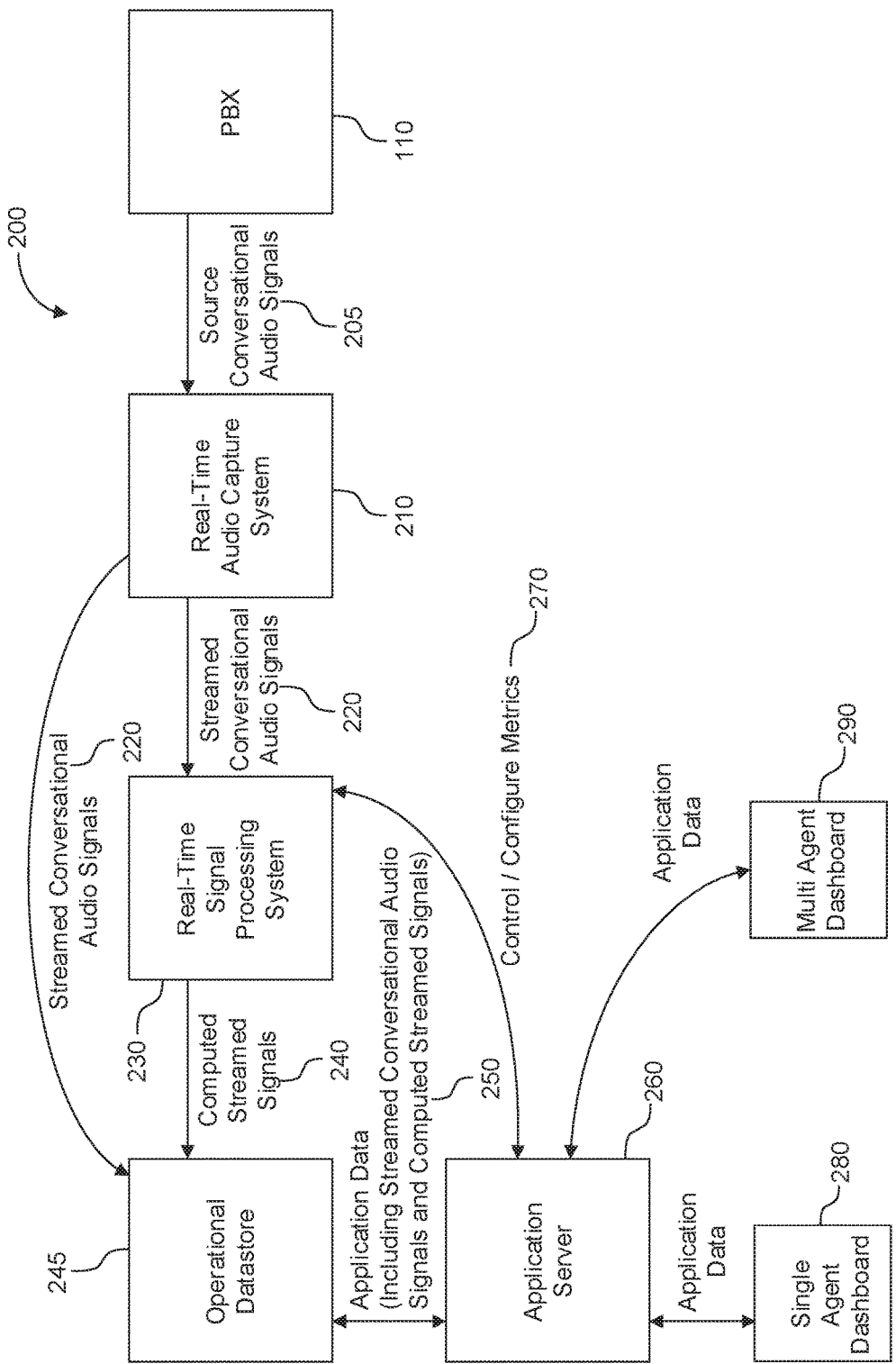
FIG. 2 is a diagram of a process for real-time analysis of audio signals according to an exemplary embodiment.

FIG. 2 is a diagram of a process 200 for real-time analysis of audio signals, according to an exemplary embodiment. Audio signals from a call are typically received from associate 105 through the private branch exchange (PBX) 110, corresponding to, for example, a telephone call center. In turn, the PBX directs the call to an answering agent 130. The audio of the agent 130 and the audio of the associate 105 are provided to the analysis system 120. The analysis system 120 may provide the analysis of the audio to the agent 130 and/or the supervisor 140.

The real-time analysis begins with source conversational audio signals 205 being transmitted to the a system or component such as real-time audio capture system 210 (e.g., module). The conversational audio signals 205 may include audio signals from the participants and/or members of a call, such as an associate 105 and agent 130. In turn, the source audio signals received by the real-time audio capture system from the PBX are converted and streamed as streamed conversational audio signals 220. This streamed conversational audio signals may, in turn, be provided (e.g., transmitted) to a real-time digital processing system and/or component 230 and to operational datastore and/or memory 240. In one example implementation, transmitting the streamed conversational audio signals include duplicating the streamed conversational audio signals, multiplexing the streamed conversational audio signals to multiple destinations (e.g., systems), and/or outputting a single stream of the streamed conversational audio signals for later processing.

In some example implementations, the real-time audio capture system and/or component 210 (e.g., module) is a dedicated computer system with processor operating software to (1) capture and/or receive source conversational audio signals, (2) convert the received source conversational audio signals to analyzable digital audio (e.g., computed streamed signal), and (3) transmit (e.g., stream) the analyzable digital audio, as multi-channel streamed conversational audio signals, to a signal processing system 230 (e.g., module) and/or datastore 245.

In some example implementations, capturing a call includes using port mirroring by a VoIP switch (e.g., port spanning or port monitoring) for use with an IP PBX, or integrating through an application programming interface (API) supported by the specific PBX used, such as Avaya DMCC API or Cisco PBX API. It should be understood that capturing audio from sources such as microphone inputs, thereby allowing source conversational audio signals to include single speaker monologues to three- or more speaker multi-participant conversations. The output stream may be in WAV format or any other audio stream format.

In some example implementations, the real-time audio capture system and/or component 210 (e.g., module) streams streamed conversational audio signals to a real-time signal processing system and/or component 230 (e.g., module). Real-time signal processing system 230 (e.g., module) receives the stream (e.g., streamed conversational audio signals 220) and transforms the streamed conversational audio signals into computed streamed signals. In turn, the computed streamed signals are provided and/or transmitted to application server 260 and/or the operational datastore 245. The computed streamed signals may be and/or include metrics based on the streamed conversational audio signals. That is, the information and/or data included in the computed streamed signals may include metrics information. In some example implementations, one or more computed streamed signals may be produced and/or generated at the same time. Computed streamed signals may be moving, running, or irregular streams of metrics.

In some example implementations, the computed streamed signals are computed using metrics that are statically configured in advance or dynamically configured while running. Moreover, new and/or additional metrics for computations may be dynamically loaded. Using dynamic and static metrics provides context-independent and context-dependent metrics to be run. That is, context dependency (e.g., context-dependent metrics) may be based on source information (e.g., participant identity and or information, location information) or may be triggered by other metrics being computed for a stream. Metrics may be configured through an extensible computational graph allowing any computation to be run.

Metric computations refer to the application and/or use of algorithms to determine and/or calculate metrics (e.g., metric data, metric values), for example, associated with audio signals, features (e.g., pitch variation, speaking rate, vocal strain), perceptual models, outcome models, and business outcomes. That is, metric computations produces data associated with audio signals in a manner that is useful to agents and supervisors, by characterizing conversations, immediately and/or in real-time, to improve the result of the conversation and enable agent improvement over time. In some example implementations, metrics which are computed and which may be transmitted (e.g., presented, displayed, graphically rendered) to agents includes conversational participation, conversational flow, dynamic variation, speaking rate, and vocal effort and hyper/hypo-articulation. One or more corresponding computations (e.g., application of algorithms, calculations) may be performed for each metric.

Conversational participation (e.g., speaking participation) metrics indicate the proportion of speaking activity among participants in a call. That is, conversational participation computations provide the fraction and/or change of fractions of a predetermined and/or elapsed time of a conversation during which either, both, or neither participant speaks. In other words, conversational participation indicates the percentage of a call during which each participant, both participants or neither participant produced audio signals (e.g., spoke). Common conversational participation algorithms are described in: (1) Nelson Morgan and Eric Fosler-Lussier, *Combining Multiple Estimators of Speaking Rate*, International Conference on Acoustic, Speech, and Signal Processing (ICASSP-98), Seattle, Wash., 1998; (2) Nelson Morgan, Eric Fosler-Lussier, and Nikki Mirghafori, *Speech Recognition Using On-line Estimation of Speaking Rate*, Fifth European Conference on Speech Communication and Technology (Eurospeech '97), Rhodes, Greece, 1997; and (3) Nivja H. De Jong and Ton Wempe, *Praat Script to Detect Syllable Nuclei and Measure Speech Rate Automatically*, Behavioral Research Methods, 2009.

Conversational flow metrics indicate the fluidity of a call. In other words, conversational flow metrics provide a measurement and/or metric that describes how fluid (e.g., unbroken) a conversation (e.g., dyadic conversation) is. Conversational flow metrics may indicate the smoothness and connection of turn-taking between participants in a conversation. In some example implementations, computations of conversational flow metrics are performed using empirically trained models (e.g., conversational flow model) generated based on perceptual experiments using human raters to rate conversations. In some example implementations, the conversational flow model uses, to compute conversational flow metrics, inputs such as speaking rate, speaking participation and dynamic variation to calculate conversational flow metrics Dynamic variation metrics indicate how dynamic (e.g., subdued, flat, lively) participants are during a call. In some example implementations, computations of dynamic variation metrics are performed using empirically trained models (e.g., dynamic variation model) generated based on perceptual experiments using human raters to rate conversations. In some example implementations, the conversational flow model uses, in order to compute dynamic variation metrics, inputs such as energy (including energy variation), mel frequency cepstral coefficients (MFCC), pitch (including pitch variation), and vocal effort (including vocal effort variation).

Speaking rate metrics indicate the articulation rate (e.g., speed) and/or syllable rate (e.g., speed) of participants speech during a call. Common speaking rate algorithms are described in: (1) Nelson Morgan and Eric Fosler-Lussier, *Combining Multiple Estimators of Speaking Rate*, International Conference on Acoustic, Speech, and Signal Processing (ICASSP-98), Seattle, Wash., 1998; (2) Nelson Morgan, Eric Fosler-Lussier, and Nikki Mirghafori, *Speech Recognition Using On-line Estimation of Speaking Rate*, Fifth European Conference on Speech Communication and Technology (Eurospeech '97), Rhodes, Greece, 1997; and (3) Nivja H. De Jong and Ton Wempe, *Praat Script to Detect Syllable Nuclei and Measure Speech Rate Automatically*, Behavioral Research Methods, 2009.

Vocal effort metrics indicate spectral gradient and periodicity characteristics of participants' speech to determine the voice quality of each participant. Vocal effort metrics may indicate whether speech is soft, breathy (e.g., includes breathing), loud, tense, and the like. Common vocal effort algorithms are described in: (1) James Hillenbrand and Robert A. Houde, Acoustic Correlates of Breathy Voice Quality: Dysphonic Voices and Continuous Speech, Journal of Speech and Hearing Research, April 1996; (2) Marko Lugger, Bin Yang, Wolfgang Wokurek, *Robust Estimation of Voice Quality Parameters Under Real World Disturbances*, Proceedings of ICASSP, 2006; and (3) K. Stevens and H. Hanson, *Classification of Glottal Vibration From Acoustic Measurements*, Vocal Fold Physiology, 1994.

Articulation space metrics indicates when speech is casually uttered and/or when speech is clearly enunciated (e.g., hyper or hypo articulation). That is, articulation space metrics identify and distinguish between clear speech and casual utterances. Common articulation space algorithms are described in: (1) Stefan Scherer, Louis-Philippe Morency, Jonathan Gratch, and John Pestian, Reduced Vowel Space is a Robust Indicator of Psychological Distress: A Cross-Corpus Analysis, Proceedings of ICASSP, April 2015; (2) Huei-Mei Liu, Feng-Ming Tsao, and Patricia K. Kuhl, *The Effect of Reduced Vowel Working Space on Speech Intelligibility in Mandarin-Speaking Young Adults With Cerebral Palsy*, Journal of the Acoustical Society of America, 2005; and (3) Benjamin. Picart, T. Drugman, T. Dutoit, *Analysis and Synthesis of Hypo and Hyperarticulated Speech*, Proceedings of the Speech Synthesis Workshop (SSW), 2010.

Conversational engagement metrics indicates the level of mental engagement between participants in a call. In some example implementations, computations of conversational engagement metrics are performed using empirically trained models (e.g., conversational engagement model) generated based on perceptual experiments using human raters to rate conversations. In some example implementations, the conversational engagement model uses, to compute conversational engagement metrics, inputs such as dynamic variation, speaking participation, and speaking rate.

Depression metrics indicate whether a participant in a call sound depressed. In some example implementations, computations of depression metrics are performed using empirically trained models (e.g., depression metrics model, "SoundsDepressed" model) generated based on perceptual experiments using human raters to rate conversations. In some example implementations, the depression metrics model uses, to compute depression metrics, inputs such as speaking rate, pitch (including pitch variation), energy (including energy variation), MFCC, and vocal effort.

The real-time signal processing system 230 (e.g., module) may be a dedicated computer system and/or a component of a system, including a processor and operating software to transform streamed conversational audio signals to computed streamed signals. In some example implementations, the real-time signal processing system 230 (e.g., module) may be implemented on the same computing device and/or system as the real-time audio capture system 210 (e.g., module), or encoded in real-time audio capture system software. In turn, the computed streamed signals 240 may be directly and/or indirectly provided to the operational datastore 245 and/or the application server 260. In some example implementations, the computed streamed signals 240 may be provided in response to an access request to the operational datastore 245.

Operational datastore 245 may store streamed conversational audio signals 220 received, for example, from the real-time audio capture system. The operational datastore 245 may store computed streamed signals 240 received, for example, from the real-time signal processing system 230. The operational datastore 245 may store application data 250 received, for example, from the application server 260. The operational datastore 245 may be a raid-based disk array used by a MongoDB database-based storage server, or any storage system able to meet storage and data access demands in real-time. The operational datastore 245 may be a dedicated hardware system or a storage hardware controlled by software running on any system.

Storing streamed conversational audio signals and the computed streamed signals in the datastore 245 provides beneficial features such as: reviewing of past (e.g., old) audio by individual agents or supervisors; applying new and/or changed metrics to past audio to obtain different and/or additional insights than from previous computed metrics; and applying multi-call analysis across multiple stored (e.g., past) audio signals.

In some example implementations, multi-call analysis includes collecting, storing, analyzing and/or displaying information related to a plurality of calls. For each call, multi-call analysis retrieves and/or displays metadata associated with a call (e.g., call identifier, parties (e.g., telephone number, identifier), length, agent identifier, agent name, agent's position, agent's supervisor, member identifier), and the like. For each call, the multi-call analysis also retrieves, calculates and/or displays tone information, pace information, participation information, and flow information. In some example implementations, the tone information, pace information, participation information, and flow information may be displayed numerically, or graphically, along the lines of the graphical representations described below with reference to FIGS. 6 and 7. Multi-call analysis may be used, for example, by a supervisor to retrieve and view information regarding a plurality of calls that have occurred or are occurring. The calls may correspond to agent's supervised by the supervisor. In some example implementations, multi-call analysis displays information for each call in a table, where each row represents a call and each column represents a type of information associated with the calls. In some example implementations, selecting a call from the table renders and/or displays a dashboard for analyzing the call, as shown in and described in more detail with reference to FIG. 6.

Stored audio signals (e.g., stored in the datastore 245) may be used to create or improve the analysis of metrics. That is, while the metrics analyzed within a conversation (e.g., acoustic metrics) are context independent, the importance and connection of these metrics with outcomes or results may vary in different contexts. For example, agents focused on sales, technical support, or customer health may have different correlations between various audio metrics and call outcomes. To this end, machine learning or other learning techniques may be applied to identify target metrics, or changes in metrics, useful in producing positive results. These, in turn, may be of use to agents and supervisors as gamified elements—e.g., target metrics or target changes likely to produce positive or better results. It should be understood that the examples embodiments and implementation described above may apply not only to call center applications, but also to other outcome-oriented situations, such as results or outcome of a single-speaker talk, speech, or presentation with and/or using analyzable audio.

Application server 260 interacts with the operational datastore 245 to access and/or retrieve computed streamed signals 240. In turn, the computed streamed signals 240 may be transmitted to and/or displayed at an agent and/or supervisor computing device, via a dashboards (e.g., single agent dashboard 280, multi-agent dashboard 290), graphical user interface or the like. The application server 260 may be a dedicated computer with processor operating application software, or may be software implemented on other system hardware. Transmitting and/or communicating among systems (e.g., application server, datastore, etc.) may be achieved using interfaces such as RESTful interfaces and HTTP communications.

Application server 260 may also communicate with real-time signal processing system 230 to configure and/or control which metrics computations are to be run and/or performed. In some example implementations, certain metrics computations may be configured to (1) always run (e.g., default), (1) run under certain situations (e.g., for a specific agent, for a specific associate, or for associates matching certain criteria such as calling from specific regions or about specific topics), or (3) run based on the results of other metrics being run. Metrics computations may also be controlled, set and/or configured dynamically during a live call, such as requesting a specific metric computation be run for a call by an agent or supervisor.

Agent dashboards (e.g., single agent dashboard 280, multi-agent dashboard 290) may request and/or receive (e.g., from an application server), and display, application data. The single agent dashboard 280 displays data related to a single source conversational audio signal, such as a single call. The single agent dashboard 280, in some example implementations, is associated with a single agent and the supervisors of that agent. The multi-agent dashboard 290 display data related to multiple calls. In some example implementations, the multi-agent dashboard 290 is associated with a single supervisor and the agents associated with that supervisor.

The single agent dashboard 280 may be a graphical user interface running on an agent's computing device, and displaying (e.g., via a screen, display, monitor, or the like) real-time information about a single conversation in which the agent is participating. The single-agent dashboard 280 may be implemented as a dedicated application, or through another accessible interface such as within a web browser. In some example implementations, the single agent dashboard 280 is accessible by a supervisor of the agent.

Figure 3:
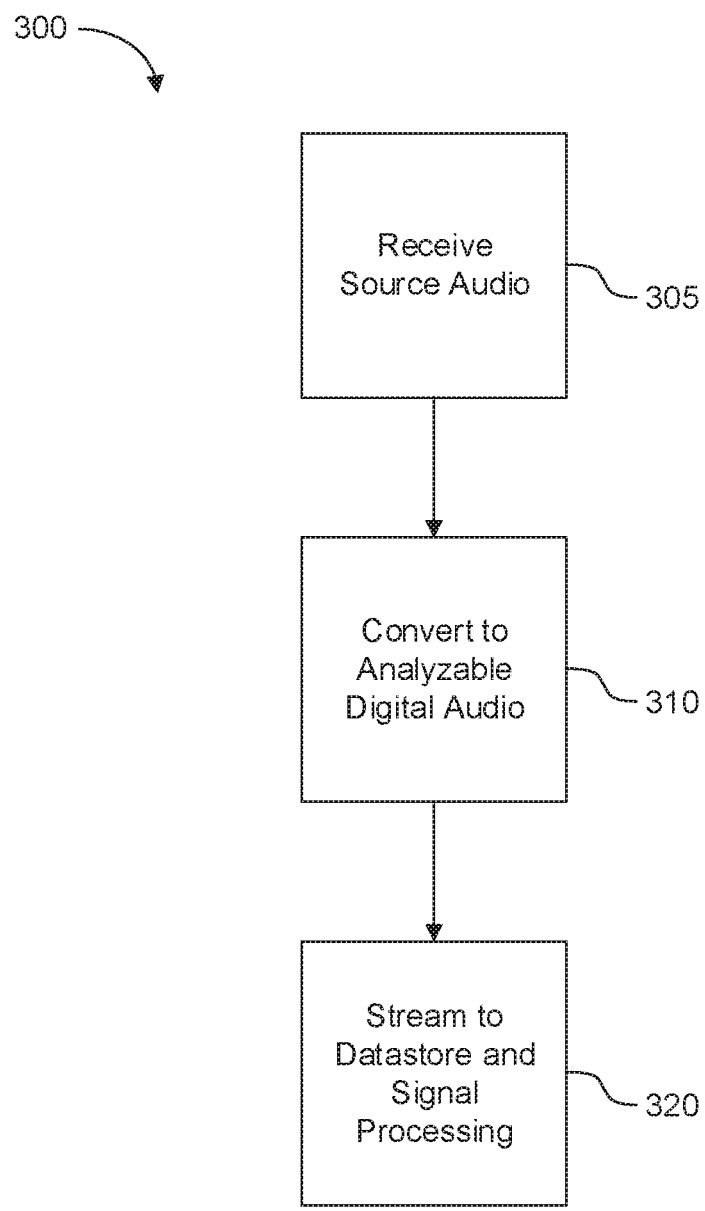
FIG. 3 is a diagram of a process for capturing audio signals according to an exemplary embodiment.

FIG. 3 is a diagram of a process 300 for capturing audio signals, according to an exemplary embodiment. In FIG. 3, real-time audio capture system or component 210 (e.g., module) may be a dedicated computer system with processor operating software to capture and/or receive source conversational audio signals, at block 305. As described above with reference to FIG. 2, the captured audio signals are converted, at block 310, to analyzable digital audio signals. In turn, the digital audio signals are streamed, at block 320, to the data store and/or signal processing system, as multi-channel streamed conversational audio signals.

Figure 4:
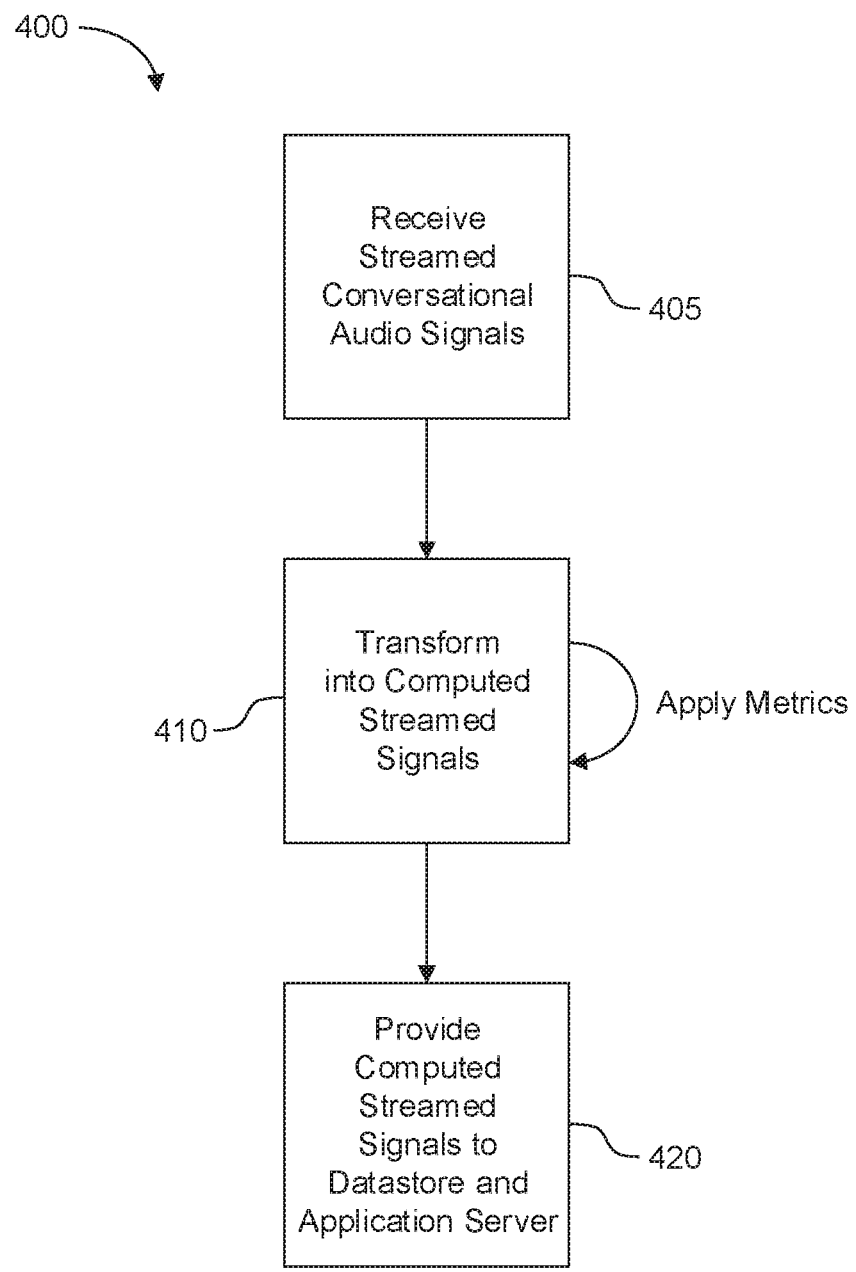
FIG. 4 is a diagram of a process for providing computed streamed signals according to an exemplary embodiment.

FIG. 4 is a diagram of a process 400 for providing computed streamed signals, according to an exemplary embodiment. The real-time audio capture system and/or component streams streamed conversational audio signals to a real-time signal processing system. In turn, as shown in FIG. 4, the real-time signal processing system and/or component 230 receives, at block 405, the streamed conversational audio signals. At block 410, the streamed conversational audio signals are transformed into computed streamed signals by applying metrics computations. In turn, the computed streamed signals are transmitted to application server 250 and/or the operational datastore.

Figure 5:
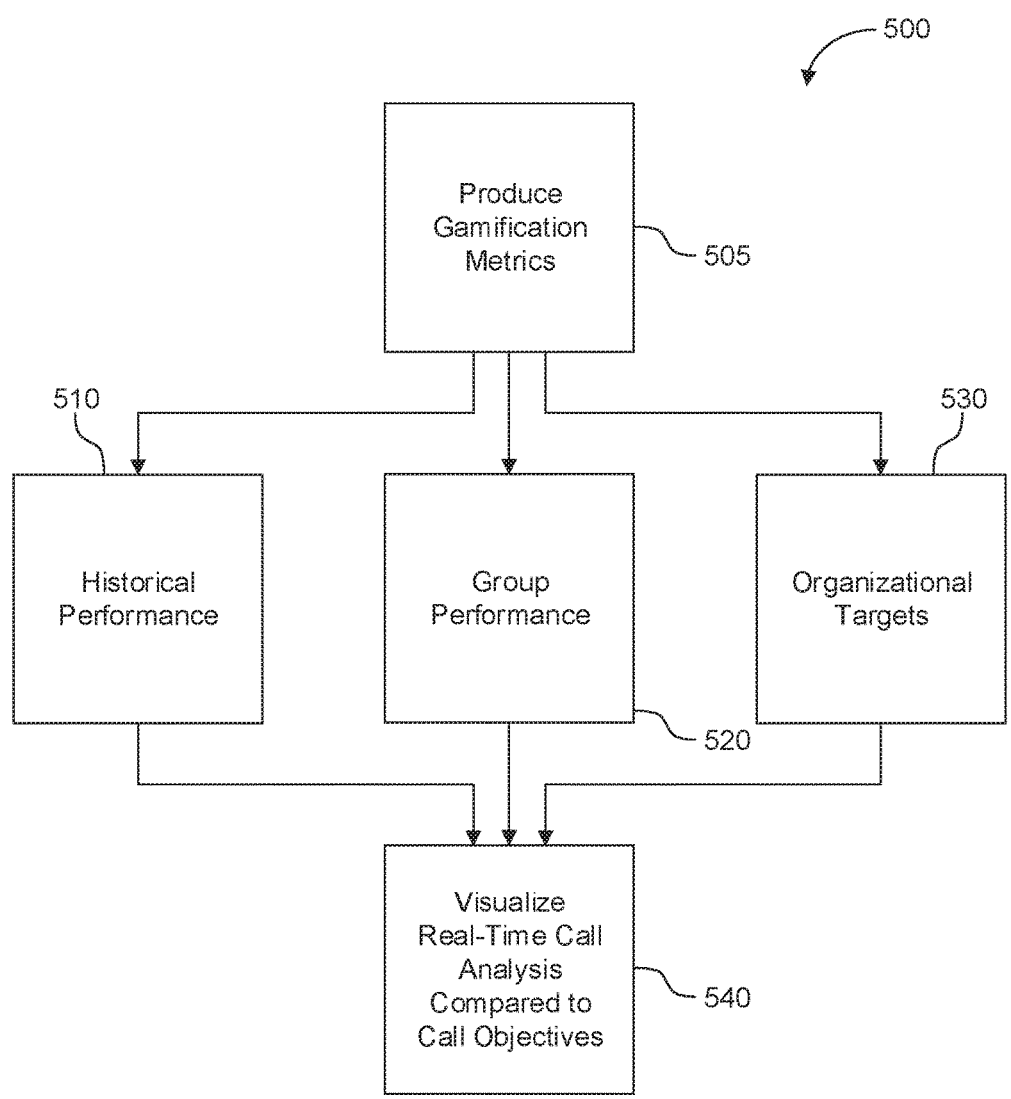
FIG. 5 is a diagram of a process for presenting gamification metrics according to an exemplary embodiment.

FIG. 5 is a diagram of a process 500 for presenting gamification metrics, according to an exemplary embodiment. The single agent dashboard 280 may present and/or display the metrics data associated with the audio (e.g., audio signals) of a call. The presented and/or displayed metrics data is provided to the agent and/or supervisor for consideration, or may be used to gamify the metrics (e.g., to produce gamification metrics 505). As used herein, gamification means comparing real-time values (e.g., metrics) against an objective (e.g., metrics)—gamification objective—to motivate an individual to reach that objective. Gamification objectives may include historical metrics. Gamifying the metrics may include comparing the metrics data to historical audio metrics 510 involving the agent, and/or comparing the metrics data to historical audio metrics from a team of agents 520 relevant to the current agent. Historical metrics may be presented as and/or include an average, range, or other discernible displayable value that an agent and/or supervisor can use to identify how the current source of audio input, such as the call, is progressing compared to historical data. This may allow action by the agent, such as identification of aspects out-of-character in a particular conversation.

Gamification objectives alternatively or additionally may include a target value 530 configured at an individual, team, or organizational level by supervisor or organization management. This target value may include or be based on learned analysis of connections between audio metrics and past business outcomes. Target metrics may be presented in a similar fashion as historical metrics, and provide both identification of aspects out-of-character and in-action or during-conversation goals for agents to target within the real-time metrics.

The multi-agent (or supervisor) dashboard 290 may be a software graphical interface running on a supervisor's computing device to display real-time information about current conversations for agents under the supervisor's supervision. The multi-agent dashboard 290 may display data about multiple conversations (live and historical) for a single agent. The multi-agent dashboard 290 may be implemented as a dedicated application, or through another accessible interface such as within a web browser. In some example implementations, a supervisor can switch their interface between multi-conversation display of live current conversations, multi-conversation display for a single agent, and single conversation display for a single agent, with graphical interface selection tools to control the number and display arrangement of the multi-conversation display features.

In some example implementations, the multi-agent dashboard 290 is a Java-based Windows desktop application that visualizes application data in real-time for multiple source conversational audio signals by connecting to an application server. Computed streamed signals are presented visually within and/or via the dashboard, and their values and appearance change in real-time based on changes in the audio signal of the underlying source conversational audio signal. Each source conversational audio signal may have multiple computed streamed signals, all of which have interval-value elements which may be changing in real-time to reflect during-conversation fluctuations in vocal aspects.

The multi-agent dashboard allows for the presentation of multiple real-time source conversational audio signals simultaneously. This allows for a supervisor to monitor multiple agents, each of whom may be participating in a conversation providing real-time source conversational audio signals. The multi-agent dashboard provides a supervisor a tool to analyze situational awareness of how a team of agents is performing in any given context, for any set of goal-directed conversation behaviors.

The multi-agent dashboard may also present gamification data in the form of current performance compared to objectives based on historical data and/or configured metrics. The gamification data may be presented at individual levels, such as in association with each agent's real-time data, or at an overall level which may combine data from all agents to display overall team-wide metrics. Team-wide metrics may be compared to other teams within an organization.

Both the multi-agent dashboard and single-agent dashboard may use historical computed streamed signal data and application data by accessing the operational datastore through, e.g., via the application server. Real-time application data provided through visualization of computed streamed signal data from agents can be visually compared to previous conversations. This allows a supervisor and/or agent to compare a single or set of real-time computed streamed signals to previous individual or sets of computed streamed signals.

The entire system, with end results visualized in the multi-agent dashboard, follows a capture-transform-visualize paradigm. The computed streamed signals are visualized without context, allowing a supervisor or agent to apply personal domain-specific knowledge and experience to the system's interpretation of the audio stream data. This personal knowledge and experience provides context for the values displayed in the dashboard, thus the computed streamed signals provide situational awareness within that context. This allows agents and/or supervisors to act in real-time as audio events such as conversations are progressing. The same values of computed streamed signals may require different actions from agents and/or supervisors in different contexts, thus the system provides a decision support mechanism, allowing the agents and/or supervisors to utilize information to drive a real-time during-conversation decision making processes. This means that the system is not limited to a particular set of outcomes, contexts, or conversation types. The same computed streamed signal data can be provided in differing and/or new environments and provide situational awareness and value to agents and/or supervisors. In this sense, the system is not designed to provide limited analytical categorization, but rather provide context-free analytical visualization, which the agents and/or supervisors can leverage and combine with additional information, experience and knowledge to drive decision-making.

The system provides a gamification of application and computed streamed signal data, by visually comparing real-time data with baseline data, based on saved historical computed streamed signal data. This interface provides users with a way to visually compare 540 an individual agent in real-time during a conversation to his or her own past performance across many conversations, to the current or past performance of the team, or to specific company or program business objectives and expected outcomes. Supervisors can utilize this information within a specific context to drive decision-making Agents can use this information within their own workflows to "gamify" their work experience, whereas their goal becomes to achieve differentiated values of specific computed streamed signals relative to their own history, that of their teammates, team averages, or company stated objectives. Gamification may also apply to over-time analysis by giving agents different targets for improvement, such as specific aspects of conversations identified as needing improvement for individual agents, and altering such targets over time as agents improve their conversational metrics.

In some example implementations, the single agent dashboard and multi agent dashboard may be implemented as a web-based application, or a mobile application, for any mobile operating system.

In some example implementations, the real time audio processing system, may integrate with or connect to mobile audio streams through mobile OS integration, to VoIP web-based applications (e.g., Skype, FaceTime) or to microphones. The real time audio processing system may use audio that is part of an audio-video transmission, and is not limited to a single audio channel.

In some example implementations, using an API, computed stream signals and application data may be visualized and/or displayed in graphical user interfaces other than a single agent dashboard or a multi agent dashboard. Such displays may be incorporated into alternative computing devices such as wearables (e.g., watches, jewelery, eye wear, etc.), desktop devices (e.g., clocks, phones, tablets, etc.), and furniture (e.g., desk, chair, cubicle wall, etc.).

In some example implementations, the gamification may be extended to a larger team or company level. A large-screen or greater dashboard interface may display larger team or organization goals and objectives and update in real-time.

In some example implementations, the input audio stream is a two-person dialog (e.g., a phone conversation), a multi-party discussion (e.g., a meeting), or a monologue. The monologue may include issuing commands to a personal device (e.g., commanding a smartphone, telling a smartphone to "turn on"). In the case of monologues, some metrics which require multiple parties, such as analysis of turn-taking within a conversation, may not apply. In such cases, the term "conversation" simply refers to the monologue event. The monologue, two-person dialog, or multi-party discussion may include one or more non-human actors (e.g., avatars or interactive voice response systems).

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

Figure 6:
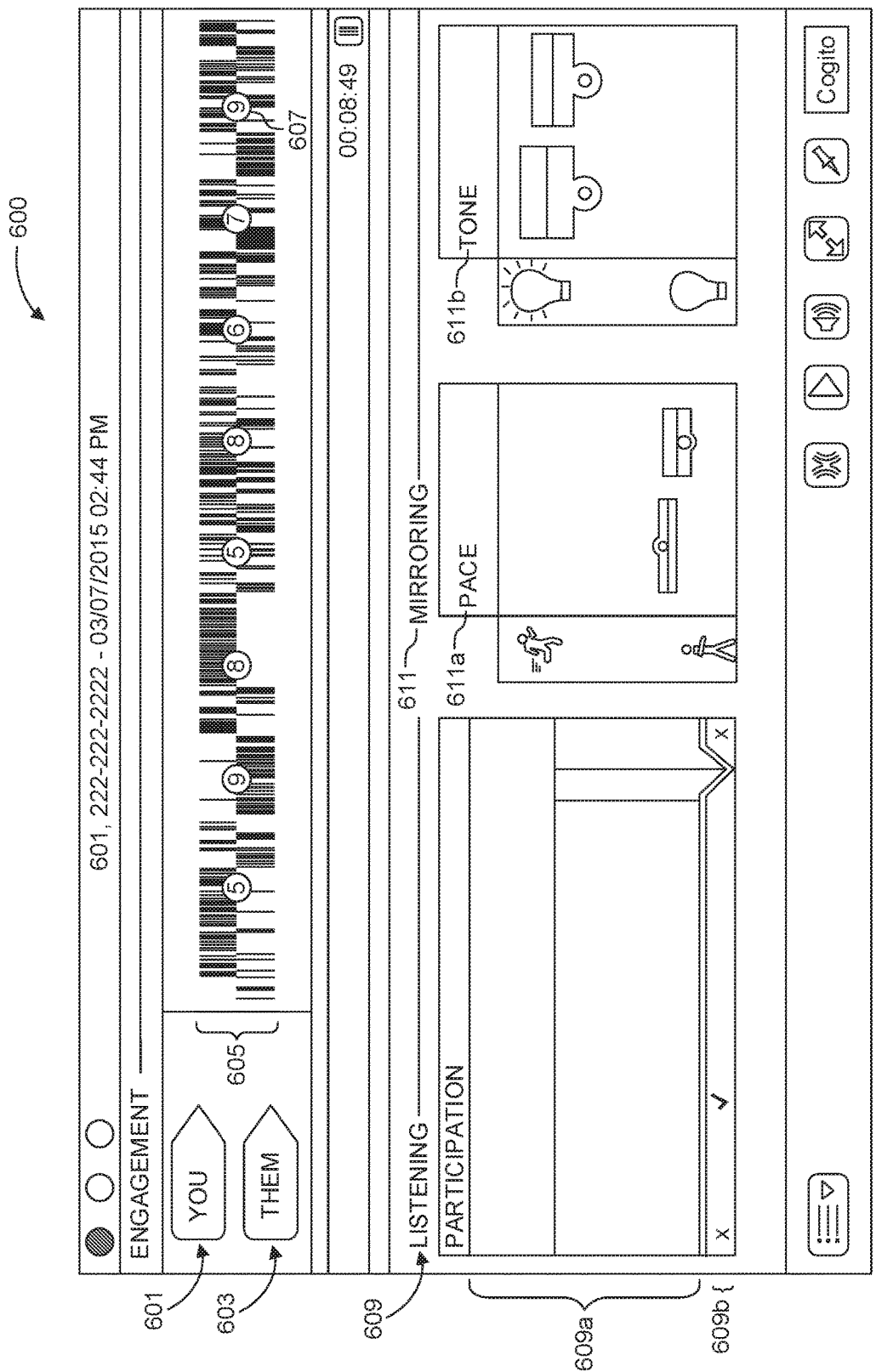
FIG. 6 illustrates a graphical user interface including a dashboard for providing real-time analysis of audio signals according to an exemplary embodiment.

FIG. 6 illustrates a graphical user interface 600 including a dashboard for providing real-time analysis of audio signals. Specifically, the dashboard displays and/or graphically renders information associated with audio signals (e.g., computed streamed signals). As shown in FIG. 6, the audio signals are associated with a call between two participants 601 (e.g., you) and 603 (e.g., them). Participant 601 may refer to the agent or viewer of the graphical user interface. Participant 603 may refer to the other participant on the call, such as an associate, customer, client, or the like. It should be understood that more than two participants may be displayed in the dashboard.

The dashboard may also include a timeline 605, which may be a portion of the dashboard for displaying information indicating which participant (e.g., 601, 603) is speaking during the call. The timeline 605 may be associated with a corresponding timeline widget which retrieves, processes, and graphically outputs data onto the timeline 605. In some example embodiments, the timeline 605 (and/or the timeline widget) receives and/or retrieves as input the audio signals and/or portions (e.g., frames) of the audio signals to graphically represent on the timeline. The timeline 605 may represent any amount of predetermined time during a call. For example, the timeline 605 may be configured to illustrate who is speaking during one or ten minute segments. The timeline includes color-coded bars and/or blocks indicating the participant that is speaking, with the right-most portion of the time-line representing the live (or latest) portion of the call being analyzed.

Graphical user interface widgets are sets of one or more graphical elements that represent various metrics presented in the real-time display of various embodiments described herein. The graphical elements may include, for example, windows, icons, charts and chart components, scrolling graphical elements, and graphical control elements (e.g., buttons, sliders, list boxes, spinners, drop-down lists, menus, menu bars, toolbars, tabs, scrollbars, frames, dialog boxes, and the like). Widgets may utilize color-coding to differentiate data corresponding to different speakers, for example. Widgets may present data that conveys historical information as well as more immediate information, simultaneously.

In FIG. 6, silence (e.g., neither participant is speaking during the call) is represented by the color white. Speech by either participant may be represented by non-white colors. In some example implementations, each participant may be assigned a different color to represent their speech on the timeline 605. The non-white blocks adjacent to and/or horizontally aligned with the label "YOU" corresponding to participant 601 represent the instances when the participant 601 is speaking during the call. On the other hand, the non-white blocks adjacent to and/or or horizontally aligned with the label "THEM" corresponding to participant 603 represents the instances when the participant 603 is speaking during the call. In some example implementations, overlapping speech (e.g., participants talking at the same time) are represented by vertically aligned and/or adjacent non-white blocks present on the timeline areas corresponding to the participant 601 and 603. It should be understood that the size (e.g., width) of each block (e.g., white, non-white) represents the amount of time of the action represented by each block. That is, a wide non-white block indicates a longer portion of speech than a thin non-white block.

The timeline 605 provides agents, supervisors and the like with the ability to, among other things, identify patterns during the call, visualize large portions of a call. The timeline 605 also helps identify long periods of speaking by a single participant and long periods of silence, both of which lead to poor conversational outcomes.

The section 607 (and similar circles or markers overlaid on the timeline 605) represents an engagement score at a given time during that call. That is, the engagement score 607 identifies how good or bad a call is at the time that the engagement score is provided. The engagement score may be provided, for example, at predetermined intervals of time (e.g., every minute). The engagement score may be based on a predetermined scale, such as 1-9, in which a score of 1 indicates a bad call and a score of 9 indicates a good call. Generally, a good engagement score indicates good tone and good listening practices. The engagement score may be determined based on the conversational engagement metrics and/or conversational engagement models described above, using inputs such as dynamic variation, speaking participation, speaking rate, and the like.

The dashboard may also include a listening portion of bar 609, which includes a participation widget 609a. The participation widget 609a is used to display the distribution of speaking between participants in a call, using audio signals or portions thereof (e.g., speaking frames or fractions) as inputs. That is, the participation widget 609a indicates color-coded representations of who has spoken during a predetermined amount of time. The distribution of speaking time is represented by colors and/or size of areas on the participation widget 609a. For example, a leftmost non-white block or area (e.g., of a first color) on the participation widget 609a represents the fraction of the predetermined amount of time during which one participant (e.g., participant 601) has spoken. A rightmost non-white block or area (e.g., of a second color) on the participation widget 609a represents the fraction of the predetermined amount of time during which another participant (e.g., participant 603) has spoken. A non-white block or area (e.g., of a third color), between the leftmost and the rightmost blocks on the participation widget 609a, represent the fraction of the predetermined amount of time during which both participants are speaking (e.g., overlapping). A white portion above the leftmost and right most portions indicates the amount of silence during a call. That is, the blocks or areas that are non-white are taller (and the white block or area is shorter) when there is less silence during a call. On the other hand, the blocks or areas that are non-white are shorter (and the white block or area is taller) when there is more silence during the call.

The participation widget 609a may also include a valence (e.g., guidance) bar, segment, portion and/or line 609b, which may indicate a suggested fraction of time that each participant should be participating. That is, the valence bar 609b indicates whether one participant is controlling and/or dominating a call relative to a suggested fraction of time. The valence bar 609b thereby indicates the suggested area with a lighter (e.g., yellow) color and/or an indented v-shaped area. In some example implementations, the valence bar indicates goals and the like to be used by agents.

The dashboard displayed in graphical user interface 600 also includes a mirroring (e.g., matching) area 611, which includes a pace widget 611a and a tone widget 611b that are used to achieve mirroring and/or matching tone and/or pace between participants in a call. The tone pace widget 611a may be a pacing meter or the like for measuring and illustrating how quickly each participant (e.g., 601, 603) is speaking during a call. In FIG. 6, the measurements illustrated higher in the pace widget 611a indicate a faster pace, and those illustrated lower in the pace widget 611a indicate a slower pace.

In pace widget 611a, the pace of each participant is represented by a different color. For each participant, the pace widget 611a includes multiple pace measurements including: an average speaking pace (e.g., pace measurements) used by the participant during a call (represented by a dark line of the participant's corresponding color); the variety of paces (e.g., pace measurements) used by the participant during a predetermined amount of time in the call (represented by a box or block area in the participant's corresponding color, in a lighter shade than the average pace line); and the most recent pace measurement used by the participant during the call (represented by a dot or circular area in the participant's corresponding color). In some example implementations, the pace widget 611a is used as a tool to achieve mirroring and/or matching pace among participants. That is, the pace widget 611a illustrates paces (e.g., average, variety, most recent) simultaneously for participants, thereby allowing the participants to attempt to have the illustrated paces mirror those of each other. Traditionally, mirroring and/or matching paces between participants indicate and/or predict more successful conversations.

The tone widget 611b may be a tone meter or the like for measuring and illustrating the tone of voice of each participant (e.g., 601, 603) during a call. That is, the tone widget 611b may indicate whether a tone of voice of a participant is, for example, energetic or monotone. The tone of each participant illustrated in the tone widget 611b may be determined based on the dynamic variation metrics and/or dynamic variation models described above, using inputs such as energy, MFCC, pitch, and vocal effort. In FIG. 6, the measurements illustrated higher in the tone widget 611b indicate a more energetic tone, and those illustrated lower in the tone widget 611b indicate a more monotone tone.

Similar to the pace widget 611a, in the tone widget 611b, the tone of each participant is represented by a different color. For each participant, the tone widget 611b includes multiple tone measurements including: an average tone (e.g., tone measurements) used by the participant during a call (represented by a dark line of the participant's corresponding color); the variety of tone (e.g., tone measurements) used by the participant during a predetermined amount of time in the call (represented by a box or block area in the participant's corresponding color, in a lighter shade than the average pace line); and the most recent tone measurement used by the participant during the call (represented by a dot or circular area in the participant's corresponding color). In some example implementations, the tone widget 611b is used as a tool to achieve mirroring and/or matching tone among participants. That is, the tone widget 611b illustrates tone (e.g., average, variety, most recent) simultaneously for participants, thereby allowing the participants to attempt to have the illustrated tones mirror those of each other. Traditionally, mirroring and/or matching tones between participants indicate and/or predict more successful conversations.

It should be understood that more than audio signals of more than two participants may be represented in a single dashboard. In some example implementations, each participant is assigned a different color (and shades of that color). It should be understood that the alignment of the areas in the dashboard, and the directions of the measurements illustrated in the dashboard may be modified in any manner that retains the representations of audio signals described above.

Figure 7:
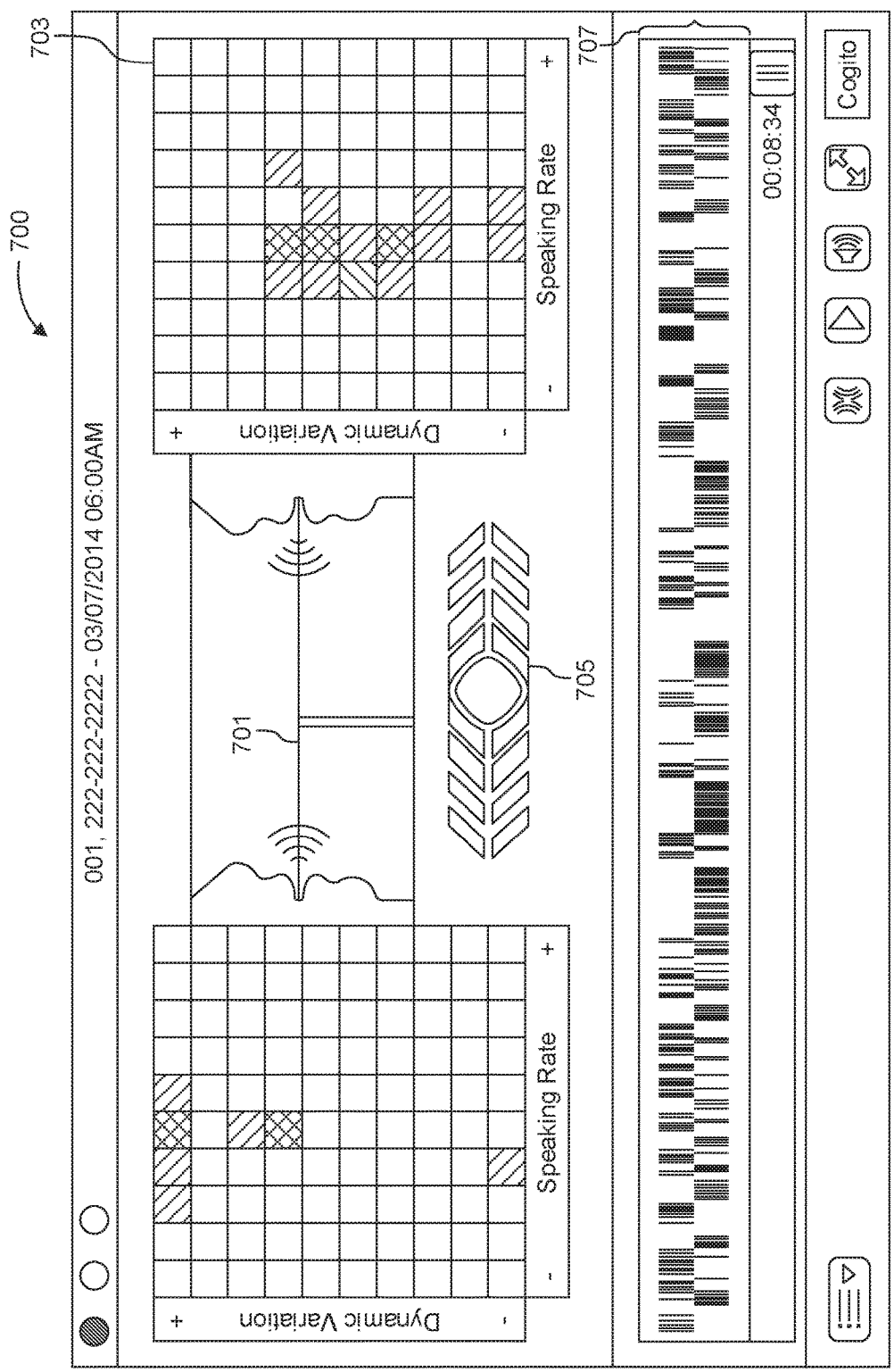
FIG. 7. illustrates a graphical user interface including a dashboard for providing real-time analysis of audio signals according to an exemplary embodiment.

FIG. 7 illustrates a graphical user interface 700 including a dashboard for providing real-time analysis of audio signals. Specifically, the dashboard displays and/or graphically renders information associated with audio signals (e.g., computed streamed signals). As shown in FIG. 7, the dashboard includes a conversational balance widget 701, a tone map 703, a conversational flow widget 705 and a speech pattern widget 707. The conversational widget 701 indicate relative participation, talk-over, interruptions, silence, and the like, between participants in a call. A high level of member participation may indicate high interest and motivation. On the other hand, a low level of member participation may indicate lack of disclosure, lack of interest, or distress and/or depression. Imbalance may also indicate that one participant's (e.g., agent) is not adhering to motivation interview practices and may need training. In some example implementations, the conversational widget 701 includes functionality similar to the functionality of the participation widget 609a and 609b. The tone map 703 indicates dynamic variation and/or speaking rate for each participant. In some example implementations, the tone map 703 includes functionality similar to the tone widget 611b. The conversational flow widget 705 indicates fluidity of participation in a conversation. In some example implementations, the conversational flow widget 705 includes functionality similar to the functionality of the participation widget 609a and 609b. The speech pattern widget 707 indicates who is speaking at a given time. In some example implementations, the speech pattern widget 707 includes functionality similar to the functionality of the timeline 605.

Figure 8:
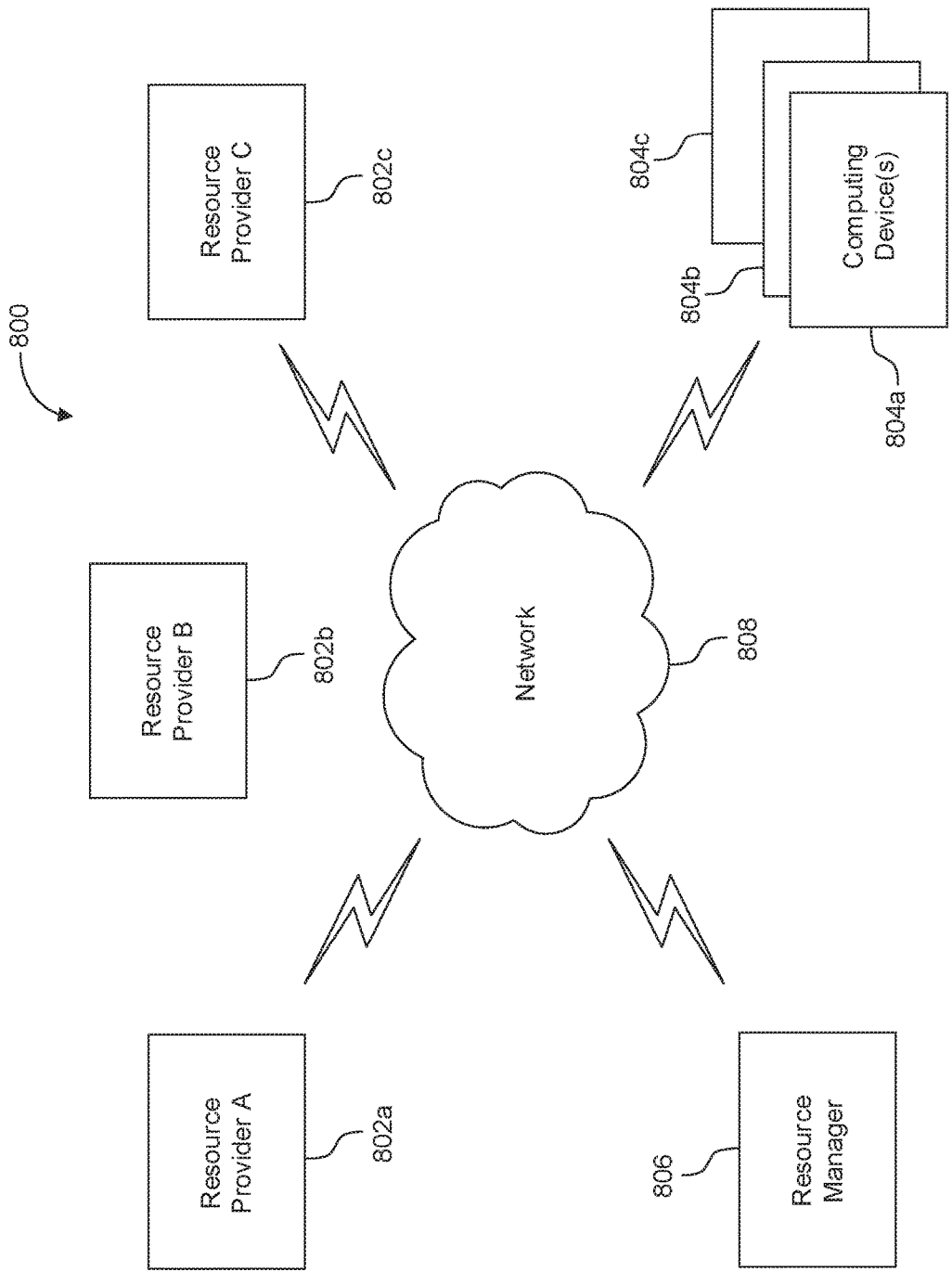
FIG. 8 shows a block diagram of an exemplary cloud computing environment.

FIG. 8 illustrates an implementation of a network environment 800 for use in a system implementing a business workflow model. In brief overview, referring now to FIG. 8, a block diagram of an exemplary cloud computing environment 800 is shown and described. The cloud computing environment 800 may include one or more resource providers 802a, 802b, 802c (collectively, 802). Each resource provider 802 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 802 may be connected to any other resource provider 802 in the cloud computing environment 800. In some implementations, the resource providers 802 may be connected over a computer network 808. Each resource provider 802 may be connected to one or more computing device 804a, 804b, 804c (collectively, 804), over the computer network 808.

The cloud computing environment 800 may include a resource manager 806. The resource manager 806 may be connected to the resource providers 802 and the computing devices 804 over the computer network 808. In some implementations, the resource manager 806 may facilitate the provision of computing resources by one or more resource providers 802 to one or more computing devices 804. The resource manager 806 may receive a request for a computing resource from a particular computing device 804. The resource manager 806 may identify one or more resource providers 802 capable of providing the computing resource requested by the computing device 804. The resource manager 806 may select a resource provider 802 to provide the computing resource. The resource manager 806 may facilitate a connection between the resource provider 802 and a particular computing device 804. In some implementations, the resource manager 806 may establish a connection between a particular resource provider 802 and a particular computing device 804. In some implementations, the resource manager 806 may redirect a particular computing device 804 to a particular resource provider 802 with the requested computing resource.

Figure 9:
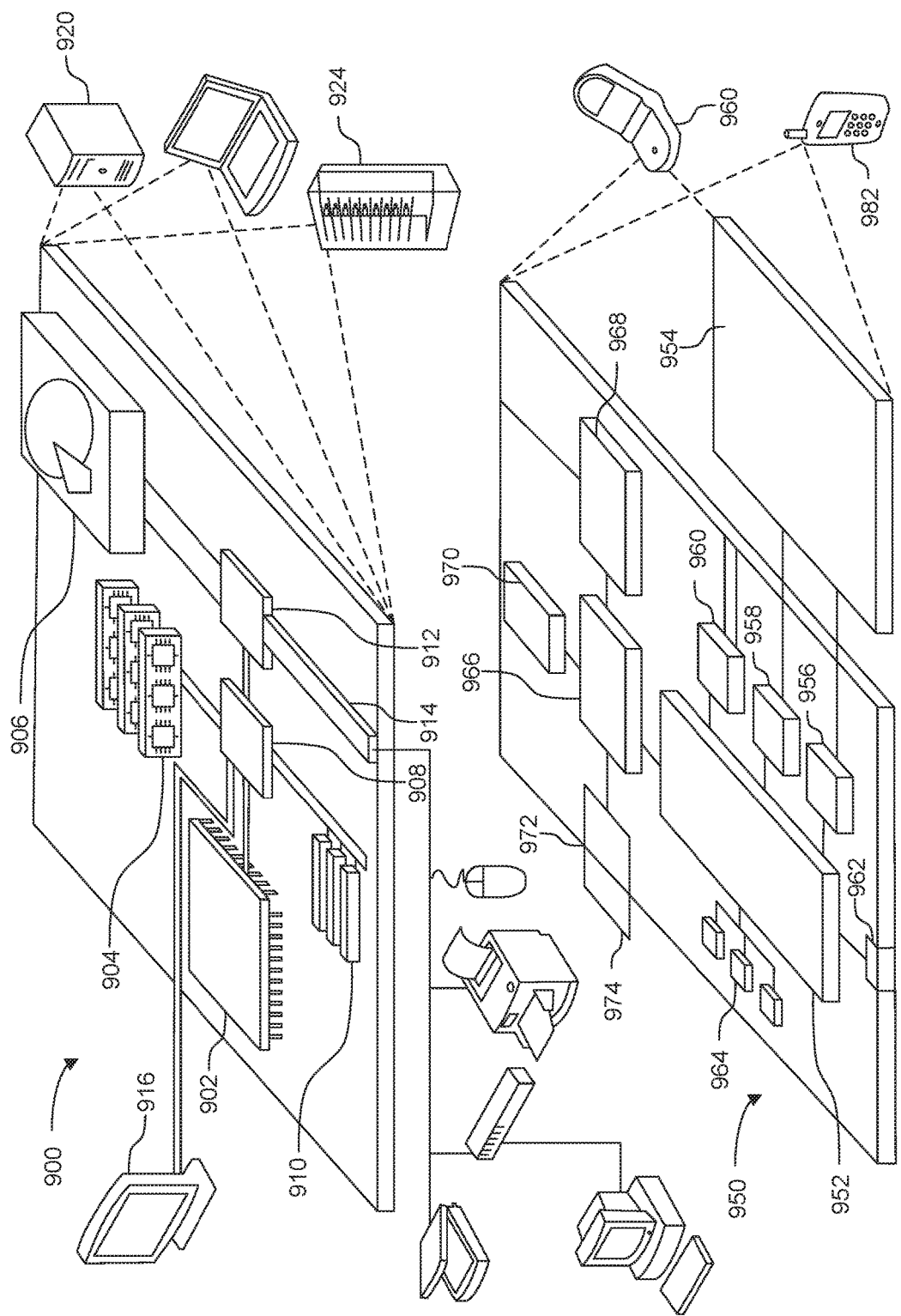
FIG. 9 is a block diagram of a computing device and a mobile computing device.

FIG. 9 shows an example of a computing device 900 and a mobile computing device 950 that can be used to implement the techniques described in this disclosure. The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer- or machine-readable mediums (for example, the memory 904, the storage device 906, or memory on the processor 902).

The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provided as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 952), perform one or more methods, such as those described above. The instructions can also be stored by one or more storage devices, such as one or more computer- or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA 900, or GPRS (General Packet Radio Service), among others. Such communication may occur, for example, through the transceiver 968 using a radio-frequency. In addition, short-range communication may occur, such as using a Bluetooth®, Wi-Fi™, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some implementations, a system and method for creating and updating a business workflow model (contextual graph) for an enterprise are provided. Having described certain implementations of methods and apparatus for supporting a business workflow model, it will now become apparent to one of skill in the art that other implementations incorporating the concepts of the disclosure may be used. Therefore, the disclosure should not be limited to certain implementations, but rather should be limited only by the spirit and scope of the following claims.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as the disclosed technology remains operable. Moreover, two or more steps or actions may be conducted simultaneously. Similarly, one or more modules may be combined into a single module and a single module as described may be separated into multiple modules. Moreover, it should be understood that the systems and methods implemented by a processor. When multiple processors are used, the processors may be located remotely from each other and communicate over a network.

Having described various embodiments of the disclose technology, it will now become apparent to one of skill in the art that other embodiments incorporating the concepts may be used. It is felt, therefore, that these embodiments should not be limited to the disclosed embodiments, but rather should be limited only by the spirit and scope of the following claims. Headers are provided for context and are not intended to be limiting.

What is claimed is:

1. A method for real-time graphical presentation of speech audio signal analytics of a multi-party telephonic communication for feedback to at least one party, the method comprising:
   computing, by a processor of a computing device, on a continuous basis during the multi-party telephonic communication between at least a first party and a second party, a set of metrics from a digital audio signal corresponding to the multi-party telephonic communication, the set of metrics comprising at least one of Group A and at least two of Group B, wherein Group A consists of:
   (i) a measure of tone with which the first party has spoken and a measure of tone with which the second party has spoken, over an interval of time;
   (ii) a measure of speaking rate at which the first party has spoken and a measure of speaking rate at which the second party has spoken, over an interval of time;
   (iii) a measure of vocal effort with which the first party has spoken and a measure of vocal effort with which the second party has spoken, over an interval of time; and
   (iv) a measure of degree of articulation with which the first party has spoken and a measure of degree of articulation with which the second party has spoken, over an interval of time; and
   Group B consists of:
   (v) a measure of amount of time the first party has spoken relative to the second party, over an interval of time;
   (vi) a measure of conversational engagement of the parties, over an interval of time;
   (vii) a measure of perceived depression with which a party has spoken, over an interval of time; and
   (viii) a measure of conversational flow over an interval of time, wherein the measure of conversational flow indicates smoothness and connection of turn-taking between participants in a conversation; and
   rendering, by a processor of a computing device, on a continuous basis during the multi-party telephonic communication, one or more graphical user interface widgets for substantially contemporaneous presentation on a display to the first party, wherein the one or more widgets are graphically representative of the set of metrics and are rendered for display on a real-time basis, wherein the real-time rendering for display is characterized by rendering at low-latency.

2. The method of claim 1, wherein the rendering step comprises rendering a timeline widget that scrolls contemporaneously with at least a portion of the telephonic communication graphically indicating when the first party is speaking and when the second party is speaking.

3. The method of claim 1, wherein the rendering step comprises rendering a numerical representation of the measure of conversational engagement at intervals contemporaneously with at least a portion of the telephonic communication, leaving behind a graphical record of engagement scores corresponding to intervals of time during the telephonic communication.

4. The method of claim 3, wherein each rendering of the engagement scores is color-coded such that low engagement scores can be immediately visually differentiated from high engagement scores.

5. The method of claim 1, wherein the rendering step comprises:
rendering a tone widget comprising a graphical element representing the measure of tone of the first party in positional relation to a graphical element representing the measure of tone of the second party, and
updating the widget substantially contemporaneously with the telephonic communication to reflect changes in the measures of tone of the first party and the second party.

6. The method of claim 5, wherein the tone widget graphically reflects both an instantaneous measure of tone of the first party and the second party, and a rolling measure of tone of the first party and the second party.

7. The method of claim 1, wherein the rendering step comprises
rendering a pace widget comprising a graphical element representing the measure of speaking rate of the first party in positional relation to a graphical element representing the measure of speaking rate of the second party, and
updating the widget substantially contemporaneously with the telephonic communication to reflect changes in the measures of speaking rate of the first party and the second party.

8. The method of claim 7, wherein the pace widget graphically reflects both an instantaneous measure of speaking rate of the first party and the second party, and a rolling measure of speaking rate of the first party and the second party.

9. The method of claim 1, wherein the rendering step comprises rendering a participation widget comprising a graphical element representing the measure of amount of time the first party has spoken relative to the second party over an interval of time.

10. The method of claim 9, wherein the participation widget comprises a color-coded graphic visually indicating whether the measure of amount of time the first party has spoken relative to the second party over the interval of time is acceptable or not.

11. The method of claim 1, wherein the set of metrics comprises at least two of Group A and two of Group B.

* * * * *